(12) United States Patent
Rodkey et al.

(10) Patent No.: US 8,165,274 B1
(45) Date of Patent: *Apr. 24, 2012

(54) SYSTEM FOR DIGITALLY NOTIFYING CUSTOMERS OF A UTILITY

(76) Inventors: Ryan Scott Rodkey, Sugar Land, TX (US); John Frank Rodkey, Jr., Missouri City, TX (US); David Lynn Hickey, Rosharon, TX (US); Darren Lynn Ross, Sugar Land, TX (US); Ronald Frank Ramsey, St. Petersburg, FL (US)

( * ) Notice: Subject to any disclaimer, the term of this patent is extended or adjusted under 35 U.S.C. 154(b) by 1160 days.

This patent is subject to a terminal disclaimer.

(21) Appl. No.: 11/960,462

(22) Filed: Dec. 19, 2007

Related U.S. Application Data

(63) Continuation-in-part of application No. 11/522,723, filed on Sep. 18, 2006, now Pat. No. 7,773,729, which is a continuation-in-part of application No. 11/117,594, filed on Apr. 28, 2005, now Pat. No. 7,130,389.

(51) Int. Cl.
*H04M 1/64* (2006.01)
*H04M 11/04* (2006.01)
*G05D 3/12* (2006.01)
*G06F 15/16* (2006.01)

(52) U.S. Cl. ............ 379/88.12; 340/332; 370/352; 379/37; 379/45; 379/114.03; 455/404.2; 700/286; 709/206; 709/223

(58) Field of Classification Search ............ 340/607, 340/332; 370/352; 379/37, 45, 79, 88.12, 379/88.19, 114.03, 201.01; 455/404.1, 412.2, 455/404.2; 700/286; 709/206, 223; 725/33
See application file for complete search history.

(56) References Cited

U.S. PATENT DOCUMENTS

| | | | |
|---|---|---|---|
| 5,694,019 A | 12/1997 | Uchida et al. | |
| 6,404,880 B1 | 6/2002 | Stevens | |
| 6,421,673 B1 * | 7/2002 | Caldwell et al. | ............ 1/1 |
| 6,442,241 B1 | 8/2002 | Tsumpes | |
| 6,463,462 B1 | 10/2002 | Smith | |
| 6,496,568 B1 | 12/2002 | Nelson | |
| 6,643,355 B1 | 11/2003 | Tsumpes | |
| 6,678,358 B2 | 1/2004 | Langsenkamp et al. | |
| 6,683,870 B1 | 1/2004 | Archer | |
| 6,697,477 B2 | 2/2004 | Fleischer | |
| 6,816,878 B1 | 11/2004 | Zimmers et al. | |
| 6,842,772 B1 | 1/2005 | Delaney et al. | |
| 6,871,214 B2 | 3/2005 | Parsons | |
| 6,912,691 B1 | 6/2005 | Dodrill | |
| 6,931,415 B2 | 8/2005 | Nagahara | |
| 6,970,535 B2 | 11/2005 | Gregory et al. | |
| 6,973,166 B1 | 12/2005 | Tsumpes | |
| 6,999,562 B2 | 2/2006 | Winick | |
| 6,999,565 B1 | 2/2006 | Delaney et al. | |
| 7,042,350 B2 | 5/2006 | Patrick | |
| 7,068,760 B2 * | 6/2006 | Binning | ............ 379/45 |

(Continued)

*Primary Examiner* — Gerald Gauthier

(57) ABSTRACT

A digital notification and response system for digitally notifying customers of an utility. The system includes a plurality of user contact devices, an application programming interface, and a dynamic information database. Real time digital user data comprising bank identified grouping information for forming user groups, user contact device information for each contact device, and utility provided user contact device priority information is received by the application programming interface and stored in the dynamic information database. The user contact device priority information is used to form a first and second group of user contact devices. Messages are transmitted through at least two industry standard gateways to the user contact devices, wherein the messages are simultaneously transmitted to the first group of user contact devices before the second group of user contact devices. Responses from the contact devices are received by the application programming interface and stored in the dynamic information database.

18 Claims, 8 Drawing Sheets

U.S. PATENT DOCUMENTS

| | | | |
|---|---|---|---|
| 7,069,303 B2 | 6/2006 | Sikora et al. | |
| 7,130,389 B1 * | 10/2006 | Rodkey et al. | 379/88.12 |
| 7,184,521 B2 | 2/2007 | Sikora et al. | |
| 7,289,489 B1 * | 10/2007 | Kung et al. | 370/352 |
| 7,353,256 B2 | 4/2008 | Delaney et al. | |
| 7,355,507 B2 * | 4/2008 | Binning | 340/332 |
| 7,362,852 B1 * | 4/2008 | Rodkey et al. | 379/88.12 |
| 7,401,147 B2 | 7/2008 | Sikora et al. | |
| 7,409,428 B1 | 8/2008 | Brabec et al. | |
| 7,418,085 B2 * | 8/2008 | Rodkey et al. | 379/88.12 |
| 7,483,519 B2 * | 1/2009 | Binning | 379/45 |
| 7,529,351 B2 * | 5/2009 | Binning | 379/45 |
| 7,684,548 B1 * | 3/2010 | Rodkey et al. | 379/88.12 |
| 7,685,245 B1 * | 3/2010 | Rodkey et al. | 709/206 |
| 7,769,495 B1 * | 8/2010 | Rodkey et al. | 700/286 |
| 7,769,496 B1 * | 8/2010 | Rodkey et al. | 700/286 |
| 7,773,729 B2 * | 8/2010 | Rodkey et al. | 379/37 |
| 7,869,576 B1 * | 1/2011 | Rodkey et al. | 379/37 |
| 2002/0032020 A1 | 3/2002 | Brown | |
| 2002/0095414 A1 | 7/2002 | Barnett et al. | |
| 2002/0156759 A1 | 10/2002 | Santos | |
| 2002/0159570 A1 | 10/2002 | Langsenkamp et al. | |
| 2003/0186716 A1 | 10/2003 | Dorenbosch et al. | |
| 2005/0013417 A1 | 1/2005 | Zimmers et al. | |
| 2005/0242944 A1 | 11/2005 | Bankert | |
| 2005/0272368 A1 | 12/2005 | Langsenkamp et al. | |
| 2005/0272412 A1 | 12/2005 | Langsenkamp et al. | |
| 2007/0096894 A1 | 5/2007 | Lemmon | |
| 2007/0201641 A1 * | 8/2007 | Bar et al. | 379/114.03 |
| 2008/0143548 A1 | 6/2008 | Grimmelmann et al. | |
| 2009/0077045 A1 | 3/2009 | Kirchmeier et al. | |
| 2009/0129563 A1 * | 5/2009 | Binning | 379/45 |
| 2009/0131088 A1 | 5/2009 | Kirchmeier et al. | |
| 2009/0135008 A1 | 5/2009 | Kirchmeier et al. | |
| 2009/0156240 A1 | 6/2009 | Kirchmeier et al. | |
| 2010/0029246 A1 * | 2/2010 | Binning | 455/404.2 |

* cited by examiner

SYSTEM FOR DIGITALLY NOTIFYING CUSTOMERS OF A UTILITY

CROSS REFERENCE TO RELATED APPLICATIONS

The present patent application is a continuation-in-part application which claims the benefit, under 35 USC §120, of prior non-provisional application Ser. No. 11/522,723, filed Sep. 18, 2006, which claims the benefit of application Ser. No. 11/117,594, filed Apr. 28, 2005, now U.S. Pat. No. 7,130,389.

FIELD

The present embodiments relate generally to the creation and delivery of messages, to the routing, and to the verification and collection of responses to the messages. The present system is universally applicable to, and independent of, the type of messaging system and device selected by the message recipients.

BACKGROUND

There exists a need for a system for efficiently and accurately transmitting messages to a user of a utility.

A need exists for a system for automating the delivery of messages and collection of message responses implemented through messaging devices of multiple types.

A need exists for a system for communication from a utility which reaches all possible forms of communication devices, so that all members of the public can be reached.

A need exists for a system that can transmit a message in multiple languages to multiple user devices to inform the public of emergency situations, and general information simultaneously.

The present embodiments meet these needs.

BRIEF DESCRIPTION OF THE DRAWINGS

The detailed description will be better understood in conjunction with the accompanying drawings as follows.

Figure 1:
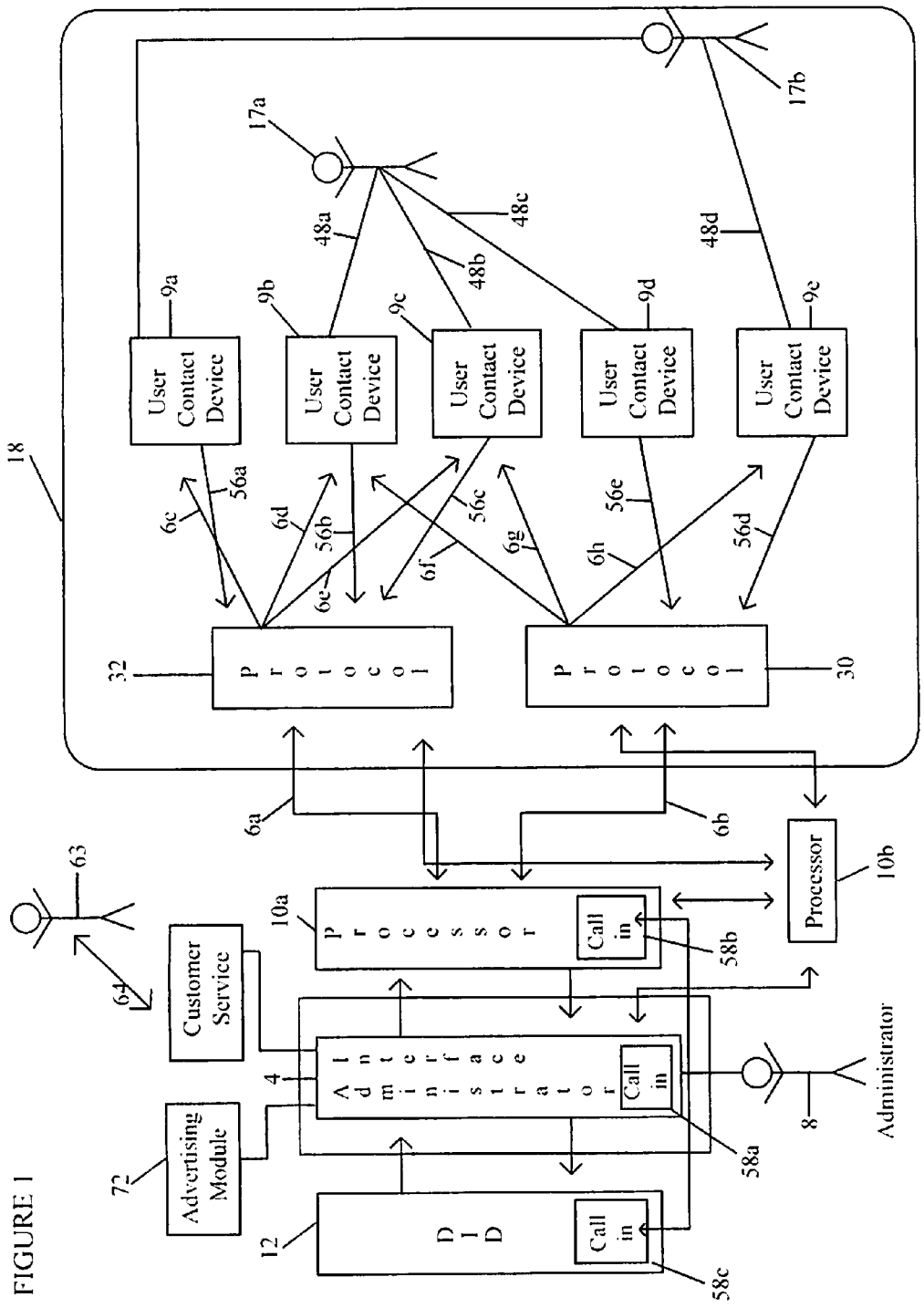
FIG. 1 depicts a representation of an embodiment of a system for transmitting messages to a user of a utility.

The present embodiments are detailed below with reference to the listed Figures.

DETAILED DESCRIPTION OF THE EMBODIMENTS

Before explaining the present embodiments in detail, it is to be understood that the embodiments are not limited to the particular embodiments and that the invention can be practiced or carried out in various ways.

The present embodiments relate to a system for digitally notifying customers of a utility. The utility can be a gas utility, a water utility, an electricity utility, a telephone utility, or combinations thereof.

The present embodiments relate to the creation and delivery of messages from the utility, to the routing of messages from the utility, and to the verification and collection of responses to the message from the utility.

The present system is universally applicable to, and independent of, the type user contact device selected by the users. The present embodiments relate to the simultaneous transmission of a message in multiple languages to one or more user contact devices, such as Spanish. The language of the message can be determined based on user contact information.

The embodiments of the system provide a timely and uniform manner to contact numerous utility customers through numerous customer contact devices, such as a cellular telephone, a television, a light emitting diode (LED) display, a webpage, a land telephone, an e-mail address, a fax machine, a pager, a digital display, a TTY/TDD device, an instant messaging device, a handheld wireless device, such as personal digital assistants (PDAs) and Blackberries™, and any combinations thereof.

The system is used to contact customers when the utility needs to deliver a message to the customers of the utility. The utility may need to contact customers to alert them to specific situations. For example, the utility may need to provide notification of brown outs, to notify a customer of an unpaid bill, to notify customers to wash their clothes after 10:00 PM, such as when decreasing energy consumption during peak hours is necessary, to inform customers when a power pole is down or service is interrupted, or combinations thereof.

The present embodiments provide a system that utilizes a high speed notification and response system. An embodiment of the system includes a plurality of user contact devices in communication with a network.

Examples of usable user contact devices include handheld wireless devices, wireless phones, land phones, e-mail addresses, digital displays, an light emitting diode (LED) display, fax machines, pagers, digital displays, TTY/TDD devices, instant messaging devices, and similar devices that capable of receiving a message. Examples of a handheld device includes a personal digital assistant (PDA), a Blackberry™, or a cellular telephone.

The present system can also include real time digital user data relating to one or more customers of a utility. The real time user data can include an user name, address, phone number, user device address, social security number, account code, and combinations thereof. The real time digital data can be provided by utility or one or more users.

The real time digital user data can include utility identified grouping information for forming at least one user group. Utility identified grouping information can include instructions for classifying users, such as by location, by payment history, by type of account with the utility, type of services received from the utility, or by any other classification or grouping.

In an embodiment the real time digital user data can include a group identification for one or more groups of users. The group identification can identify a user group by area code, zip code, or any other type of classification. A user can be a member of multiple groups.

For example, a utility can form a group of users that includes all customers of the utility that have an electricity payment that is more than 30 days overdue, and a second group of users that includes all customers that utilize a power grid that is expected to experience brown outs during the next week. Messages relating to payment options and collections can then be efficiently transmitted to the first group of users, while messages relating to power outages and brown outs can be transmitted to the second group of users. Grouping of users allows each user within a group to be treated identically by the present system, allowing the present system to transmit messages systematically to large groups of users without searching the dynamic information database each time a message is sent.

One or more of the groups of users can be represented as a list. The list allows for accurate indexing of the users within the group of users. The list can be a searchable list and can include any items of real time digital user data.

The real time digital user data can also include user contact device information for each user contact device. The user contact device information can include the type of user contact device, a unique identifier of the user contact device, such as an IP address or mac address, a manner in which the user contact device is to be contacted, such as a telephone number or e-mail address, and other similar information for enabling each user contact device to be contacted using the present system.

The real time digital user data can further include utility provided user contact device priority information, which can include a priority order that directs the present system to contact the user contact devices in a selected order. The utility provided user contact device priority information can also be provided independent of the real time digital user data.

For example, each user having multiple user contact devices can indicate a preferred first contact device. The preferred first user contact devices can then receive a message from the utility before receiving the message on additional user contact devices, ensuring that users receive messages on their preferred first contact devices before the utility contacts alternate user contact devices.

It is also contemplated that the priority order can designate user contact devices of critical users to be contacted before user contact devices of other users. For example, during an emergent situation, such as downed power lines, user contact devices of response personnel can be contacted with pertinent safety information before the user contact devices of other affected users are contacted with information relating to power outages, thereby maximizing the response time provided to critical users in an emergent situation.

The present system can further include an application programming interface for receiving the real time user data. The application programming interface can be in communication with one or more processors and the network.

The application programming interface can be in communication with a local area network, a wide area network, a virtual private network, asynchronous transfer mode network, a synchronous optical network, a call center interface, a voice mail interface, a satellite network, a wireless network, or other similar means to transmit and receive messages to or from numerous contacts.

The present system can also include a dynamic information database in communication with the processor for storing the real time digital user data. The dynamic information database can be a SQL™ database, a MySQL™ database, an Oracle™ database, or other similar industry standard databases.

In an embodiment, the dynamic information database can be encrypted. The encrypted dynamic information database can include at least one encryption key, such as a 1024 bit AES encryption key.

It is contemplated that a first group of user contact devices for each user in the one or more user groups, and a second group of user contact devices for each user can be formed using the utility provided user contact device priority information.

In a contemplated embodiment, the application programming interface can receive a user message with updated real time digital user data from one or more user contact devices, and can update the real time user data can in the dynamic information database using the user message. For example, a user who has relocated and changed addresses and home telephone numbers can use a user contact device to transmit updated real time digital user data to the application programming information, such as by sending an e-mail to the utility.

The present system can further include at least two industry standard gateways for transmitting at least one message from the utility, through the application programming interface, to one or more of the plurality of user contact devices. The one or more messages are contemplated to be simultaneously transmitted to the first group of user contact devices before being simultaneously transmitted to the second group of user contact devices. The user contact devices are contemplated to be contacted in the order defined by the utility identified user contact device priority information.

In an embodiment, the two or more industry standard gateways can be a SMTP gateway, a SIP gateway, and H.323 gateway, and ISDN gateway, a PSTN gateway, a softswitch, or combinations thereof.

The message can be a text message, a numerical message, one or more images, one or more videos or animations, or a combination of these. The message can be encoded.

The message can be a prerecorded message, a prewritten message, or combinations thereof.

In an embodiment, the message can include activation of an audio alarm, a visual alarm, a designated ring tone, or combinations thereof.

The message can include a designation that identifies the importance of the message. Examples of these designations include low priority, general priority, significant priority, high priority, and severe priority.

It is contemplated that the application programming interface can receive one or more responses from one or more of the user contact devices through the two or more industry standard gateways. The responses can be stored in the dynamic information database.

Responses can indicate that a user contact device has successfully received a message. Responses can also include "error in response" messages, indicating that insufficient user contact device information exists to transmit a message to a user contact device. Responses can further indicate when a telephone number, e-mail address, or similar piece of user contact information is invalid.

The application programming interface can be adapted to remove duplicate user contact devices from the user contact device information. For example, if a husband and wife are utility users in the same household, the application programming interface can identify that the a home telephone, being used as a contact device for both the husband and wife, is a duplicate contact device, and remove the duplicate contact device from the dynamic information database so that the contact device will be contacted only once.

In an embodiment of the system, the application programming interface can control an administrator interface. The application programming interface can provide additional code and/or instruction to the administrator interface for creating and transmitting messages to the user contact devices. The instructions can be XML code, a flat text file, or similar code. The application programming interface can receive information from a tool developed by a third party company and deploy the use of the tool.

The application programming interface can be adapted to control the administrator interface to only transmit the at least one message within a predefined time interval. The application programming interface can also include a manual override to allow messages to be transmitted at any time, even if outside of the predefined time interval, and to prevent messages from being transmitted within the predefined time interval.

In an embodiment of the invention, the user contact devices can be resorted based on utility selected user contact device information. It is contemplated that resorting the user contact devices can include associating one or more user contact devices with different groups, altering the priority information for one or more user contact devices, ordering each user contact device within one or more groups by a selected item of user contact data, such as the type of contact device, and other similar groupings or sortings.

A message can then be transmitted to the resorted user contact devices. The message transmitted to the resorted user contact devices can indicate any changes that have been made, or the message can indicate only that resorting has occurred.

It is further contemplated that the application programming interface can form new groups of users using user contact device information and instruction from the utility. For example, the utility could provide instruction that a new group of users should be formed for users who have not paid their bill in the last 30 days, and the application programming interface would be used to form the new group of users that meet the criteria of the instruction. The related contact device information for each user in the new group of users would be applied accordingly, allowing each user within the new group of users to receive messages sent to the new group of users.

It is further contemplated that the system can have a survey stored in the dynamic information database and that the application programming interface can transmit the survey to one or more of the user contact devices. The survey can be used to collect information from users, such as whether users are satisfied with their utility services, or whether a user wants to upgrade utility services. The survey could also be used to request additional information to help to keep the utility's records or user information current. A response to the survey can be received using the application programming interface. The response can be stored in the dynamic information database. Survey responses can be used to generate one or more reports.

It is also contemplated that the system can include a searchable list stored in the dynamic information database that includes the last message sent to at least one of the users. This searchable list can allow one or more recently-transmitted messages to be retransmitted to a user upon request. The searchable list can also be used to track transmitted messages and received responses to ensure that each user has received one or more messages. The searchable list is also useful for ensuring that messages are transmitted to the first group of user contact devices before being transmitted to the second group of user contact devices.

Use of the present system can be illustrated using the following example:

An application programming interface, in communication with an Intel™ processor and the internet, can be used to receive real time digital user data, such as the names, addresses, and contact device information for multiple users of a utility, such as Reliant Energy. The utility can provide this information by inputting data from its customer records to the processor, however it is also contemplated that one or more customers could also provide the real time digital user data by transmitting the data to the utility, such as by using an on-line form using a computer, cellular telephone, personal digital assistant, or similar contact device.

One or more groups of users can be formed from the real time digital user data using utility identified grouping information, which can include instructions from Reliant Energy for classifying users. For example, Reliant Energy may wish to place all users who have a bill more than 30 days past due into a single group for communication regarding payment options. Reliant Energy can also form other groups of users, such as all users within a single power grid, who can be grouped by location to receive messages relating to power outages or brown outs in their respective areas. A user can be a member of multiple groups.

Each user will have at least one user contact device, such as a home telephone, an e-mail address, or a pager, and the user contact devices are formed into at least a first group and a second group using utility identified user contact device priority information. For example, a user Mary Smith may have a home telephone number 832-281-7134, placed in the first group, and an e-mail address, Mary42427@yahoo.com, placed in the second group.

The utility identified user contact device priority information can identify which user contact devices should be contacted first, and placed in the first group of user contact devices, which will be contacted before the second group, depending on the nature of the message to be transmitted. For example, Reliant Energy customers located in the vicinity of a downed power line may have contact devices grouped in a first group of user contact devices, for receiving a transmitted safety message about the downed power lines, before users remote from the area are contacted with a message regarding expected power outages due to the downed power line.

The first group can also include one or more users' preferred first method of contact, while the second group includes a preferred alternate user contact device. For example, Mary Smith may prefer to be contacted using her home telephone first, then only contacted using her e-mail address if attempts to contact her using her home telephone are unsuccessful.

The user contact devices placed in the first and second groups for contact can vary depending on the nature of the message to be sent.

At least one message, such as "Your Reliant Energy bill is more than 30 days overdue," or "Power lines are down in Southeast Houston; Expect rolling brown outs until 12:00 AM" is then transmitted from the utility through the application programming interface to at least one user contact device in the first group, using at least two industry standard gateway protocols simultaneously. For example, the message can be sent using a SMTP gateway and a SIP gateway simultaneously. This redundancy maximizes the chance that each message reaches each user contact device.

The message is simultaneously transmitted to all user contact devices in the first group, in this example Reliant Energy customers in the vicinity of the downed power lines, before being transmitted to each user contact device in the second group, in this example, all other Reliant Energy customers whose electricity may be affected by the downed power lines.

Each contacted user contact device then transmits response information, such as an audio tone file, indicating receipt of the message. Receipt of the audio tone file response by the utility allows the utility to verify that the user received the message. If a user contact device is not reached, error-in-response information can be generated, so that Reliant Energy can track which items of user contact information are invalid.

Through receipt of response information and tracking of transmitted messages, the utility can ensure that each user contact device of the first group was contacted before each user contact device of the second group.

The embodiments of the invention can be best understood with reference to the figures.

FIG. 1 depicts an embodiment of a digital notification and response system that can be used to perform the embodiments of the present method. The system is usable with a network 18, such as the internet, wherein an administrator 8, such as an account manager from Reliant Energy, can transmit one or more messages 6a through 6h, such as "Power lines are down in Southwest Houston; Expect spotted power outages" to one or more user contact devices 9a, 9b, 9c, 9d, and 9e, such as telephones, e-mail addresses, and pagers, using an application programming interface 4. The application programming 4 interface is in communication with one or more processors 10a, 10b, such as an AMD™ processor, the network 18, and a dynamic information database 12, such as a SQL™ database. The application programming interface 4 can be used to receive real time digital user data, such as user names, addresses, and user contact device information, from the utility.

The administrator 8 can be a person, a computer, an agency, an analog notification system, another digital notification and response system, a governmental agency, a utility provider, a corporation, or combinations of these entities.

The administrator 8 can interact with the application programming interface 4 to begin the process of sending one or more messages, which are shown in FIG. 1 as 6a through 6h to one or more user contact devices 9a, 9b, 9c, 9d, and 9e.

The application programming interface 4 can be in communication with a local area network, a wide area network, a virtual private network, asynchronous transfer mode network, a synchronous optical network, a call center interface, a voice mail interface, a satellite network, a wireless network, or other similar means to transmit and receive messages to or from numerous contacts.

The message can be a text message, a numerical message, one or more images, an audio message, or a combination of these. The message can be encoded.

The message can include a designation that identifies the importance of the message. Examples of these designations include low priority, general priority, significant priority, high priority, and severe priority. The designations can coincide with the Homeland Security five-color system. The designations can be color-coded, such as green for a low priority message, blue for a preparedness message or general priority message, yellow for a cautionary message such as a significant priority, orange for an emergency message or high priority message, or red for a critical message with a severe priority. The priority levels can be customized to incorporate different levels of emergencies, or they can be tailored to standards for a particular industry, such as building owner and managers standard codes for risks or emergencies in a building.

As show by FIG. 1, the message is then transmitted to various devices. The message is formed by an administrator 8 using the application programming interface 4 and data from the dynamic information database (DID) 12, and using at least one processor, shown in FIG. 1 as two linked processors 10a and 10b, a "processor cluster." The message or messages are transmitted through at least two standard industry protocols 30 and 32, simultaneously, such as a SMTP and a SIP gateway, which are part of a network 18 in communication with user contact devices 9a, 9b, 9c, 9d, and 9e, which are controlled by one or more users 17a and 17b. The users contact devices 9a, and 9e are controlled by a first user or group of users 17a, and user contact devices 9b, 9c, and 9d are controlled by a second user or group of users 17b. Users 17a and 17b can be in different groups of users. The message can be transmitted to each user contact device of user 17a before being transmitted to the user contact devices of user 17b. It is also contemplated that user contact devices 9a and 9b could be in a first group of user contact devices, which includes preferred first contact devices for users 17a and 17b, while user contact devices 9c, 9d, and 9e are in a second group of user contact devices. User contact devices 9a and 9b could then be contacted before user contact devices 9c, 9d, and 9e are contacted. The groupings of user contact devices are determined by the utility provided contact device priority information.

The users can be individuals or entities that are customers of a utility. The users can receive a message, send a message, respond to a message, receive more than one message, respond to more than one message, or combinations of these activities.

Examples of usable user contact devices include handheld wireless devices, wireless phones, land phones, e-mail addresses, digital displays, a light emitting diode (LED) display, fax machines, pagers, and similar devices that capable of receiving a message. Examples of a handheld devices include a personal digital assistant (PDA), a Blackberry™, or a cellular telephone.

The message(s) 6a through 6h can be stored in the dynamic information database 12.

The messages can be prewritten messages stored in the database for subsequent use by the administrator 8, or the messages can be generated from the dynamic information database 12 by the administrator creating a custom message based upon inputs from the administrator.

Each message can be given a designation which can be textual, color coded, imaged with an icon, animated, or combinations thereof. If textual, a designation can read, low priority, general priority, significant priority, high priority, and severe priority. A color coded designation can be a color associated with a priority, such as red for severe priority and green for low priority. The message can contain an image or icon, which a user can pre-select to represent the priority of the message, such as an exclamation point for emergencies. The messages and priority codes can be prewritten and stored in the dynamic information database 12 for subsequent use by the administrator.

Once the message has been received by the one or more user contact devices, a response, such as an audio tone file, can be transmitted from those contact devices indicating that the message has been received. The responses 56a, 56b, 56c, 56d, and 56e can be transmitted back through the two industry standard protocols 30 and 32 simultaneously to the processors 10a and 10b and stored in the dynamic information database 12.

The responses from the user of the network can be any type of textual response, an image, an audio file, dual tone multi-frequency tone (DTMF), or other similar responses.

In addition, a customer server interface 64 can be in communication with the application programming interface 4. The customer server interface 64 can have a GUI interface connected to the network for use by a customer service support representative 63 to assist users with the system. The customer service interface can contain text boxes of instructions. The customer service interface can have the dual advantage of being able to transmit alerts as well, providing a redundancy should the primary administrator interface fail.

An advertising module 72 can be in communication with the application programming interface 4. The advertising module can enable an advertiser to place ads, such as offers to upgrade utility services, in association with a message for transmission. The ads can be stored in the dynamic information database 12. The advertising module is usable to hold audio files, images files, video files, such as banner ads of a advertiser, and place the ads before or after a message. Use of ads can enable users to self-fund implementation of the present method.

The advertising module 72 can be used to insert header and footer files in the message to personalize the message to the group of users to whom the message is addressed.

FIG. 1 also shows a call in feature, which enables users to call in and retrieve previously sent messages and receive updates. In one embodiment, the call in feature 58a can be contained in the administrator interface (shown in FIG. 3). In another embodiment the call in feature 58b can be contained in one of the processors of the system. In still another embodiment, the call in feature 58c can be contained in the dynamic information database. In yet another embodiment, the call in feature can be in one or all of these components of the system.

Figure 2:
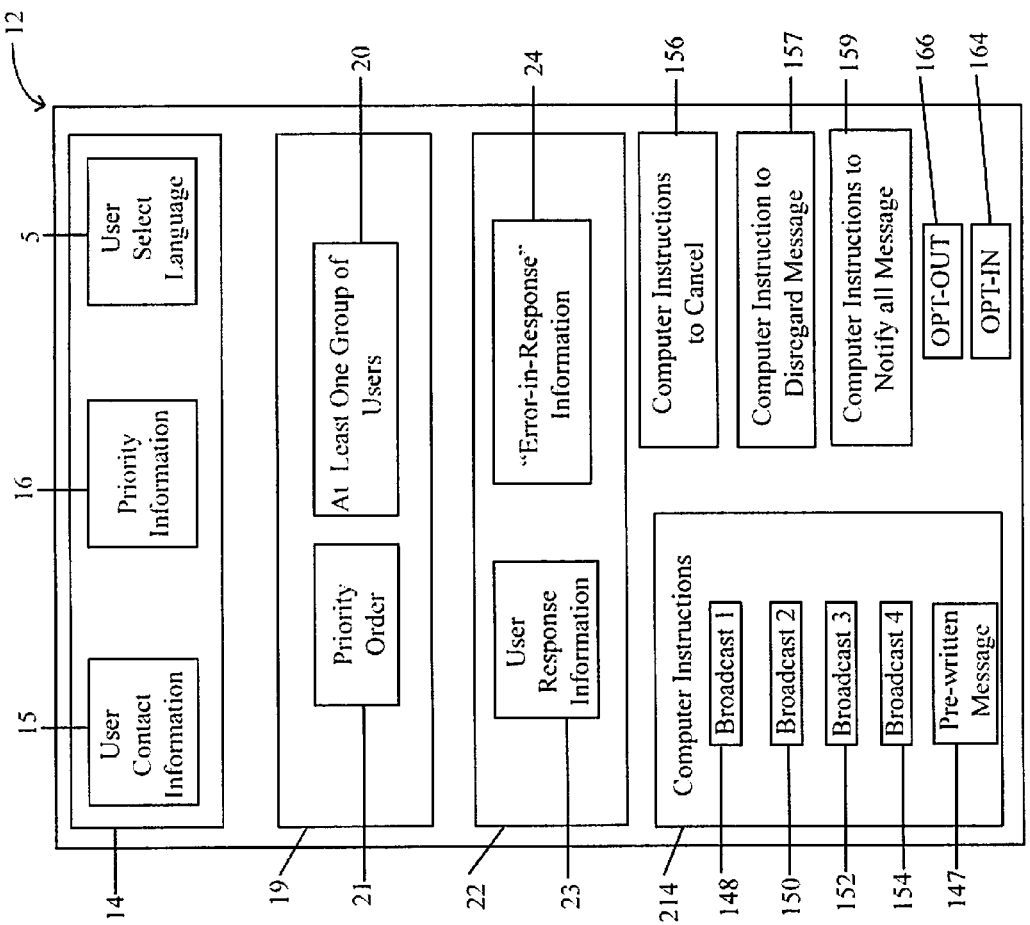
FIG. 2 depicts a representation of an embodiment of a dynamic information database usable with an embodiment of a system for transmitting messages to a user of a utility.

FIG. 2 shows a schematic of the dynamic information database 12. The dynamic information database includes user contact information 14, which includes user contact device information 15, and utility provided user contact device priority information 16. In another embodiment of the invention, the user contact device information 14 can include a user selected language 5, such as Spanish, for the message.

The user contact device information 15 can include an e-mail address, a user device internet protocol (IP) address, and combinations thereof. Each user contact device can include information that can be unique to each individual user contact device or, information that can be common to all user contact devices. For example, a serial number for a cell phone, a Mac address for an Ethernet card, and other similar information can be included.

The user priority information includes the order in which the user wants the user devices to be contacted. For example, a particular user may desire that a Blackberry™ be contacted first, a cellular telephone second, a home telephone third, and then an e-mail address fourth. However, all messages can be transmitted simultaneously to all devices, if needed.

Additionally, the dynamic information database 12 contains grouping information 19, which includes at least one group of users 20. For example, the group of users can be FIMA employees, or users of a defined geographic area, such as Houston 100-year flood zone inhabitants.

In an embodiment, the grouping information can have a utility identified user contact device priority information 21.

The utility identified user contact device priority information 21 directs the application programming interface 4 to contact a first group of contact devices, such as a user contact device indicated as a first contact. After all of the contact devices in the first group of contact devices have received the message, the utility identified user contact device priority information directs the application programming interface to contact a second group of user contact devices, which can include user contact devices indicated as second contacts. Then, the application programming interface continues to relay messages to contact devices based on the utility identified user contact device priority information until all contact devices are reached and a response is provided from the contact devices. The utility identified user contact device priority information of the user devices can selected by the utility.

The dynamic information database can further include response information 22, as shown in FIG. 2, which can be transmitted from the contact devices through at least the two standard industry protocols 30 and 32 simultaneously, through the processors 10a and 10b, to the dynamic information database 12.

The response information provides information on whether the contact devices received the message. The response information 22 can include user response information 23 that indicates the user device has received the message, or "error-in-response" information 24 that indicates the user device has not received the information, perhaps because contact information was insufficient and the message cannot be delivered properly. The "error in response" information 24 can also indicate that an email address, phone number, or contact device is invalid.

FIG. 2 also shows that the dynamic information database 12 (DID) can further include computer instructions 214 to enable the processor to broadcast messages at a future specific date and time 148, such as a broadcast on Monday, Aug. 8, 2006 at 5:55 pm. Computer instructions can also enable the processor to broadcast the message a predetermined periodic intervals 150, such as every Tuesday in the month of August at 7:00 am.

The dynamic information database can include computer instructions to broadcast the message to a defined geographic area 152, such as all users located within a single power grid, and computer instructions to broadcast the message to select wireless devices 154, such as specific users, independent of location, which have an overdue bill.

The broadcasts can use prewritten messages 147 or custom designed messages.

The dynamic information database (DID) also includes computer instructions enabling the administrator to cancel a message 156 in progress or a message scheduled for delivery at a future date and time. The dynamic information database can also include computer instructions 157 for enabling administrators to transmit a "disregard" message notification for users that received the message while administrators cancel messages in progress.

In an embodiment, the DID includes computer instructions for notifying the administrator when all messages have been delivered to the target users 159.

In an embodiment, the DID can have computer instructions allowing users to opt-in to the system 164, for allowing users to receive messages from the system. It is contemplated that users can opt-in using a user contact device, or by contacting the utility directly.

In an embodiment, the DID can include computer instructions providing an opt-out to the system 166, permitting one or more users to opt-out from receiving messages. Therefore, users can opt-in to gain the service of the present method, or opt-out to remove themselves from receiving further messages.

The dynamic information database 12 can be a SQL™ database, a MySQL™ database or other industry standard databases, an Oracle™ database, or other similar database that can organize information in a similar manner.

The industry standard protocols can be a Megaco/H.248 protocol, simple message transfer protocol (SMTP), a short message service protocol (SMS), a multimedia message service protocol (MMS), an enhanced message service protocol (EMS), a media protocol control protocol (MGCP), a SIP protocol, a H.323 protocol, and ISDN protocol, a PSTN protocol, and combinations thereof.

Figure 3:
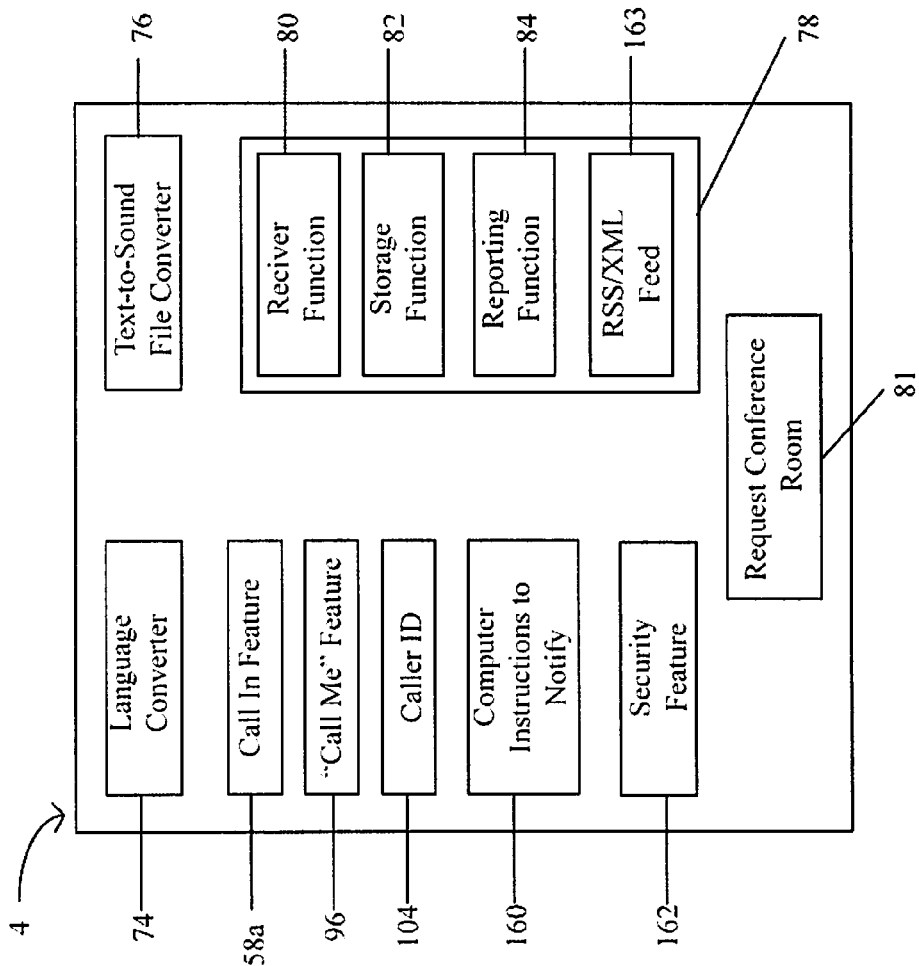
FIG. 3 depicts the administrator interface associated with an embodiment of a system for transmitting messages to a user of a utility.

FIG. 3 shows the components of the application programming interface 4. The application programming interface 4 has a "call in" feature 58a enabling an administrator 8 to call the digital notification and response system to send a message to at least one user contact device on the network. The "call in" feature 58, is shown located in one or more devices. "Call in" feature 58a can be in the application programming interface 4, "call in" feature 58b can be in one of the processors 10a, and "call in feature" 58c can be located in the dynamic information database 12.

The application programming interface 4 also has a language converter 74, such as Systran™ or Babelfish™, for translating the message to be transmitted into a user selected language. The application programming interface 4 can have a text-to-sound file converter 76, such as Microsoft Speech Server™, for translating the message from text to a sound file.

The application programming interface 4 can include a responder module 78 which can include a receiver function 80, for receiving responses from the user device that reply to the message. The responder module can include a storage function 82 for recording the received responses in dual-tone-multiple frequencies (DTMF) or interactive voice response (IVR) format in the dynamic information database 12. The responder module can include a reporting function 84 for creating reports 200 (shown in FIG. 4) using the received responses.

The responder module can also include a "really simple syndication" "extensible mark up language" (RSS)/XML feed 163 from a reliable source, such as CNN news, and the feed can be transmitted to the user devices from the processor that receives the feed 163. For example, one or more users, which can opt-in to receive the feed or be selected to receive the feed by the utility, can receive periodic news updates using the present method. The feed 163 can be filtered, allowing users to receive news updates relating only to selected topics, which can be selected by the utility or by individual users.

The application programming interface 4 can further include computer instructions enabling an administrator to request an electronic "conference room" 81 that can be entered by users of the system. The "conference room" can include a textual interface, such as for receiving and displaying text messages or messages from instant messaging programs. The "conference room" can be telephonic, allowing users and administrators to have verbal, real time conversations using telephones and similar devices.

The application programming interface 4 can further include computer instructions for notifying the administrator when all messages have been delivered to the target users 160.

In an embodiment, the administrator interface can have a security feature 162 for controlling access to the system. The security feature 162 can allow for security access by using a bar code reader, a radio frequency identification device "RFID" tag reader, a scannable badge reader, a security token, a smart card reader, a biometric reader, magnetic card reader, and combinations thereof.

Additionally the application programming interface 4 can have a computer instructions that provide a "call me" feature 96. The "call me" feature enables an administrator 8 to compose a message to send out to a user or groups of users of a network.

Also, the application programming interface 4 can include a "caller ID" feature 104, enabling a user to call a number, use an account code, obtain messages previously transmitted to that user, and update messages currently being transmitted to the user.

Figure 4:
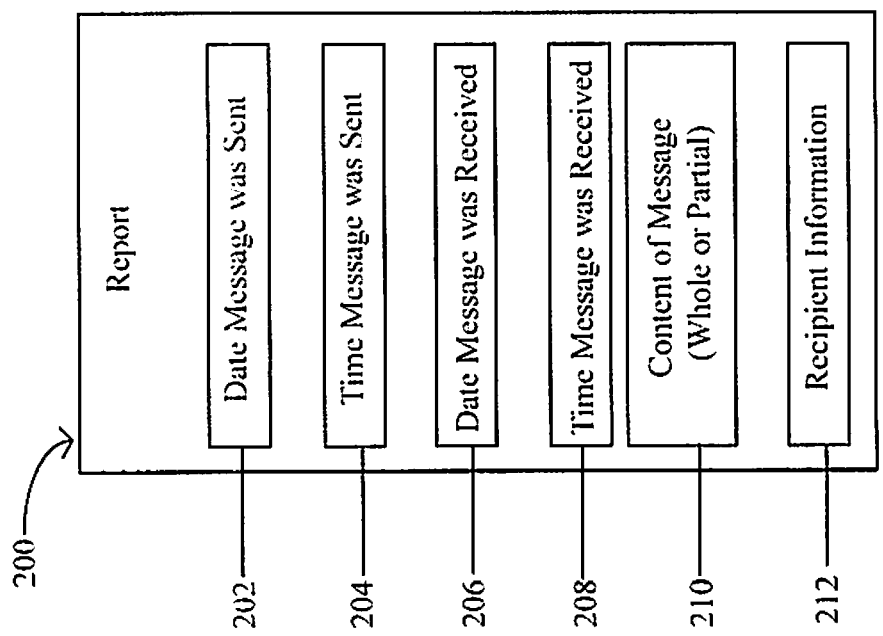
FIG. 4 depicts a representation of an embodiment of a report associated with an embodiment of a system for transmitting messages to a user of a utility.

FIG. 4 depicts an embodiment of a responder module which can be used to create reports 200. The report can include a date the message was sent 202, such as Apr. 24, 2006, a time the message was sent 204, such as 1:15 PM, a date the message was received 206, such as Apr. 24, 2006, a time the message was received 208, such as 1:18 PM, content of the message, which can be part of the message or the whole message 210, recipient information of the message 212, such as a user name, address, and telephone number, and combinations of these elements. The reports can be generated by the administrator, a user, or both.

Other examples of information that can be included on a report are the names of the person who received the message, a copy of any voice mails transmitted with the message or associated with a particular message, a time when an e-mail message was read, the time when a fax was printed by the user. The report can be transmitted to users of the network, requesting a second response from at least one user of the network The administrator can create custom designed reports, such as reports relating to all users having a bill more than 30 days past due, or standard reports, such as reports indicating which users received a message, can be generated from the dynamic information database for use by the administrator.

Figure 5:
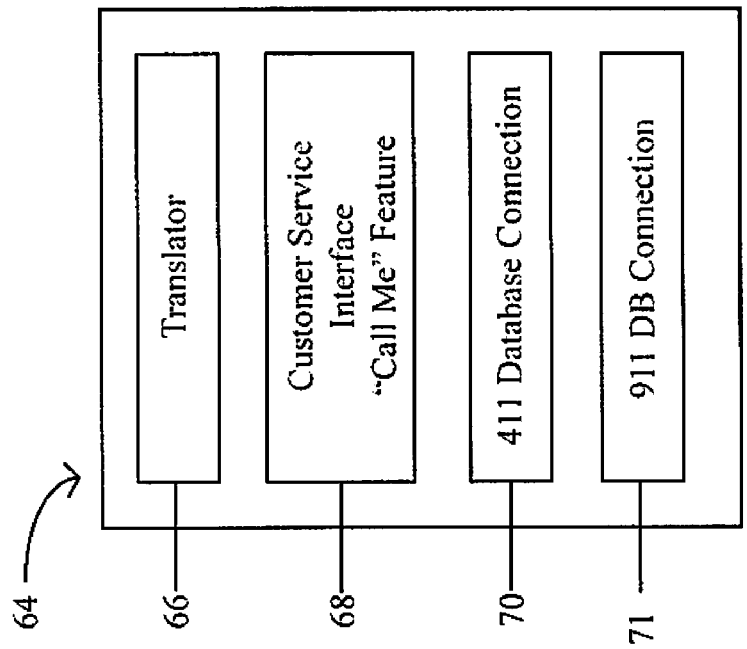
FIG. 5 depicts the customer service interface associated with an embodiment of a system for transmitting messages to a user of a utility.

FIG. 5 shows a diagram of the customer service interface 64 which can have a translator 66, such as an individual that can speaks multiple languages, a customer service interface "call me" feature 68, a 411 database connection 70 for providing information to users, a 911 database connection 71 for users of the network to gain information about emergent situations or to report emergencies such as power outages, and combinations thereof. The call me feature can have one or more of these elements and be usable herein.

Figure 6:
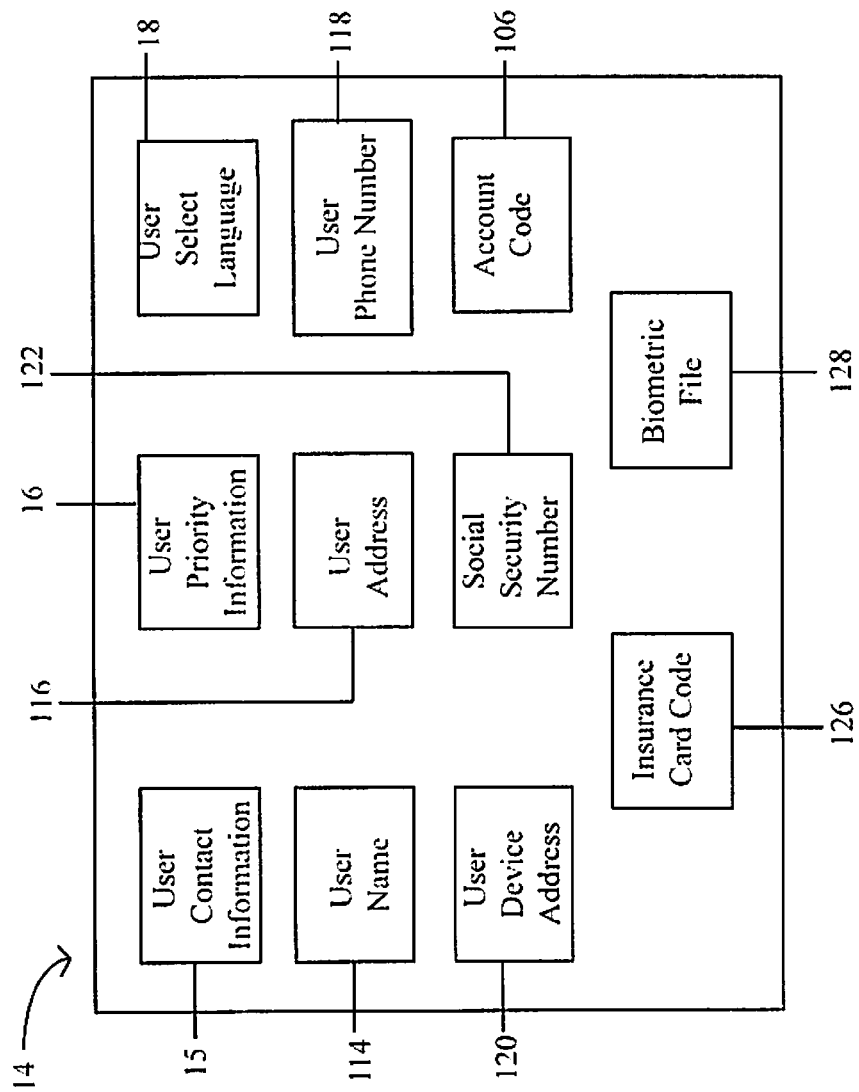
FIG. 6 depicts user contact device information associated with an embodiment of a system for transmitting messages to a user of a utility.

FIG. 6 shows a diagram of real time digital user data 14 resident in the dynamic information database 12. The real time digital user data 14 can include user contact device information 15, utility provided user contact device priority information 16, and a user selected language 18 for the messages.

The user selected language 18 for the message can be any language such as, Chinese, Dutch, English, French, German, Italian, Japanese, Korean, Norwegian, Portuguese, Russian, Spanish, Swedish, Vietnamese, or other additional languages.

The utility identified user contact device priority information 16 indicates a contact order for various user contact devices. The contact order can be used to direct the order in which the dynamic information database transmits a message to the user contact devices.

The utility provided user contact device priority information 16 can also contain a priority order that directs the administrator interface to contact a first group of user contact devices indicated as a first contact. After all of the user contact devices in the first contact have received the message, the priority order can direct the administrator interface to contact a second group of user contact devices indicated as a second contact. The administrator interface can then continue to contact user contact devices based on the priority order until all user contact devices are reached and a response is provided from the user contact devices.

The real time digital user data 14 can include information associated with the user of the user contact device.

FIG. 6 depicts the real time digital user data having a user name 114, such as Mary Smith, a user address 116, such as 1027 W. Jester St. 77804, a user phone number 118, such as 832-281-7134, a user device address 120, such as 128.7.256.234, a user social security number 122, such as 443-55-4852, an account code 106, such as 8032 2466 1147 5852, an insurance card code 126, such as AB10-20X a biometric file 128, such as a fingerprint, and combinations thereof. The real time digital user data can be used by the user to obtain updates to the message by calling into the network.

Figure 7:
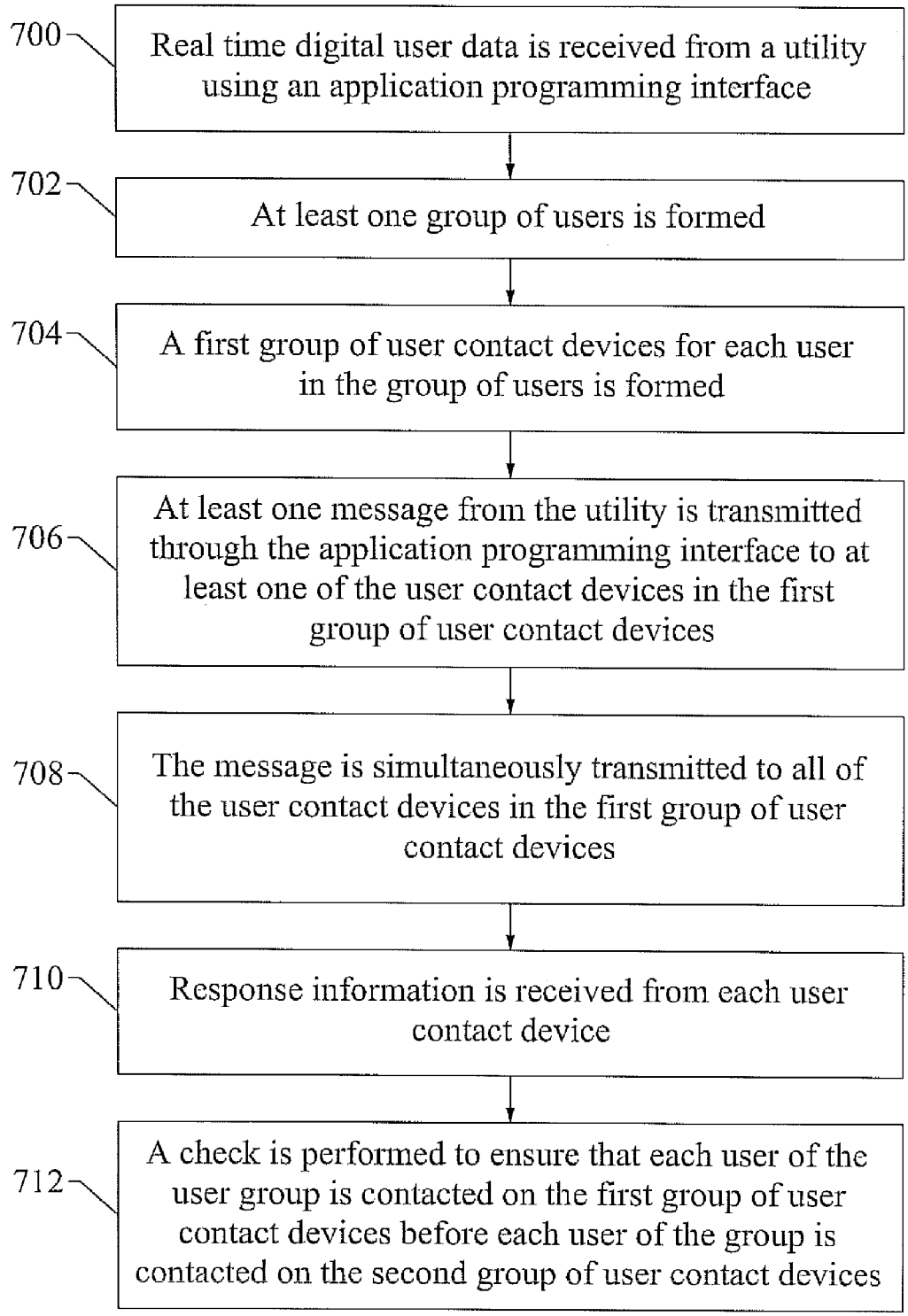
FIG. 7 depicts an embodiment of the method for transmitting a message to a user of a utility.

FIG. 7 depicts an embodiment of a method for digitally notifying customers of a utility useable with the present system.

In step 700 real time digital user data is received from a utility using an application programming interface, and the real time digital user data is stored in the dynamic information database.

In step 702 at least one group of users is formed. The groups are formed using the real time digital user data and utility identified grouping information, wherein each user in the groups of users has at least one user contact device. Each of the user contact devices has associated user contact device information.

In step 704 a first group of user contact devices for each user in the group of users is formed. In step 704 a second group of user contact devices for each user in the group of users can also be formed. The groups of contact devices are formed using utility identified user contact device priority information.

In step 706 at least one message from the utility is transmitted through the application programming interface to at least one of the user contact devices in the first group of user contact devices. The message is simultaneously transmitted through at two industry standard gateway protocols.

In step 708 the message is simultaneously transmitted to all of the user contact devices in the first group of user contact devices. Then, in step 709 the message is transmitted simultaneously to each of the client contact devices in the second group of user contact devices.

In step 710 response information is received from each user contact device. The application programming interface is used to receive the response information, and the response information is transmitted from the client contact devices through the two or more industry standard gateway protocols simultaneously.

In step 712 a check is performed to ensure that each user of the user group is contacted on the first group of user contact devices before each user of the group is contacted on the second group of user contact devices.

Figure 8:
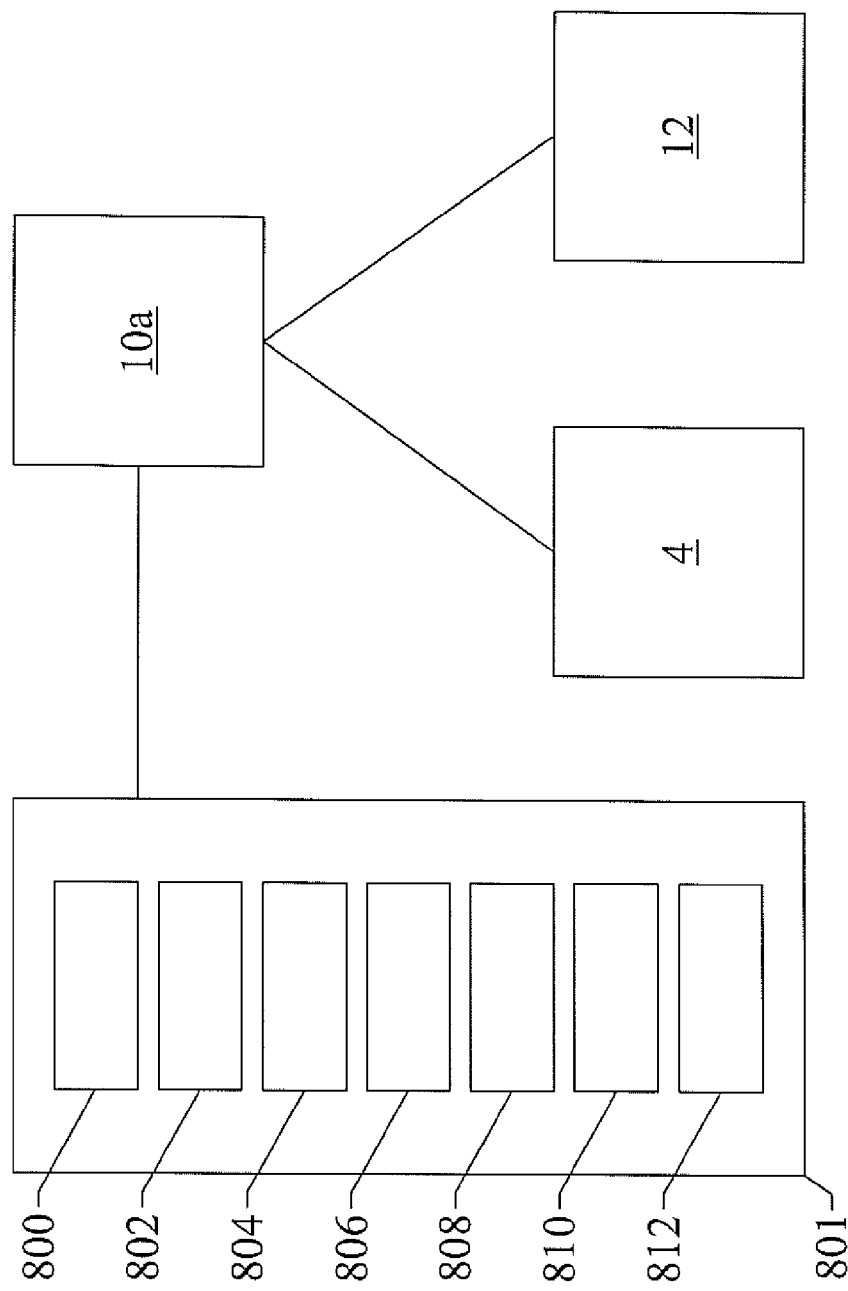
FIG. 8 depicts computer instructions for digitally notifying customers of a utility.

FIG. 8 depicts computer instructions 801 for digitally notifying customers of a utility.

The computer instructions 801 can be stored on computer readable medium and can be in communication with a processor 10*a*. The processor 10*a* is in communication with a network, the dynamic information database 12, and the application programming interface 4.

The computer instructions 800 can instruct the processor to receive real time digital user data from a utility using the application programming interface. Computer instructions 800 can also instruct the processor to store the real time digital user data in the dynamic information database.

Computer instructions 802 instruct the processor to form at least one group of users of the utility from the real time user data. To form the group, the computer instructions use utility identified grouping information.

Each user in the one or more groups of users has at least one user contact device. Each of the user contact devices has associated user contact device information.

Computer instructions 804 instruct the processor to form a first group of user contact devices and a second group of user contact devices. The groups of user contact devices are formed using utility identified user contact device priority information.

Computer instructions 806 instruct the processor to transmit at least one message from the utility through the application programming interface to at least one of the user contact devices in the first group of user contact devices. The message is transmitted using at least two industry standard gateway protocols simultaneously.

Computer instructions 808 instruct the processor to transmit the at least one message simultaneously to at least one user contact device in the second group of user contact devices.

Computer instructions 810 instruct the processor to receive response information from each user contact device. The response information is received using the application program interface, and is transmitted from the user contact devices through the two or more industry standard gateway protocols simultaneously.

Computer instructions 812 instruct the processor to ensure each user is contacted on the first group of user contact devices before each user is contacted on the second group of user contact devices.

The embodiments have been described in detail with particular reference to certain preferred embodiments, thereof, but it will be understood that variations and modifications can be effected within the scope of the embodiments, especially to those skilled in the art.

What is claimed is:

1. A digital notification and response system for digitally notifying customers of a utility comprising:

a plurality of user contact devices in communication with a network;

real time digital user data comprising: utility identified grouping information for forming at least one user group, user contact device information for each user contact device, and utility provided user contact device priority information;

an application programming interface in communication with a processor and the network for receiving the real time digital user data from the utility;

a dynamic information database in communication with the processor for storing the real time digital user data, wherein a first group of user contact devices for each user in the at least one user group and a second group of user contact devices for each user in the at least one use group are formed using the utility provided user contact device priority information;

at least two industry standard gateways for transmitting at least one message from the utility through the application programming interface to the plurality of user contact devices, wherein the at least one message is simultaneously transmitted to the first group of user contact devices before being simultaneously transmitted to the second group of user contact devices; and wherein the application programming interface receives a response from at least one of the plurality of user contact devices through the at least two industry standard gateways simultaneously, and wherein the response is stored in the dynamic information database.

2. The system of claim 1, wherein the at least one message comprises predefined messages selected from the group consisting of: "power lines are down", "there is a brown out", "you didn't pay your bill", "wash your clothes after 10:00 pm", or combinations thereof.

3. The system of claim 1, wherein the utility is a gas utility, a water utility, an electricity utility, a telephone utility, or combinations thereof.

4. The system of claim 1, wherein the real time digital user data further comprises a group identification for the at least one user group.

5. The system of claim 1, wherein the at least user group is represented as a list.

6. The system of claim 1, wherein the application programming interface is adapted to receive a user message with updated real time digital user data from at least one of the plurality of user contact devices and update the real time digital user data in the dynamic information database using the user message.

7. The system of claim 1, wherein the application programming interface is adapted to form new groups of users using the user contact device information and instruction from the utility.

8. The system of claim 1, wherein the at least one message from the utility comprises activation of an audio alarm, a visual alarm, a designated ring tone, or combinations thereof.

9. The system of claim 1, wherein the application programming interface controls an administrator interface and provides additional code to the administrator interface for creating and transmitting messages to the plurality of user contact devices.

10. The system of claim 9, wherein the application programming interface is adapted to control the administrator interface to only transmit the at least one message within a predefined time interval, and wherein the administrator interface comprises a manual override to suppress the predefined time interval to allow the at least one message to be sent at any time.

11. The system of claim 1, wherein the at least one message comprises a survey for requesting additional information.

12. The system of claim 11, wherein the application programming interface is adapted to receive a survey response to the survey and store the survey response in the dynamic information database.

13. The system of claim 1, wherein the dynamic information database further comprises a searchable list of the last message sent to at least one of the plurality of user contact devices.

14. The system of claim 1, wherein the dynamic information database is encrypted.

15. The system of claim 14, wherein the encrypted dynamic information database has at least one encryption key.

16. The system of claim 1, wherein the application programming interface communicates with a local area network, a wide area network, a virtual private network, an asynchronous transfer mode network, a synchronous optical network, a call center interface, a voice mail interface, a satellite network, a wireless network, or combinations thereof.

17. The system of claim 1, wherein the at least two industry standard gateways are selected from the group consisting of: a SMTP gateway, a SIP gateway, and H.323 gateway, and ISDN gateway, a PSTN gateway, a softswitch, and combinations thereof.

18. The system of claim 1, wherein the plurality of user contact devices are selected from the group consisting of: handheld wireless devices, wireless phones, land phones, e-mail addresses, fax machines, pagers, digital displays, LED displays, webpages, a TTY/TDD devices, instant messaging devices, and combinations thereof.

* * * * *